(12) United States Patent
Fomitchev

(10) Patent No.: US 7,806,323 B2
(45) Date of Patent: Oct. 5, 2010

(54) SYSTEM AND METHOD FOR PROVIDING ACTIVATION AND EXPIRATION DATA ASSOCIATED WITH NEWLY ISSUED FINANCIAL PRESENTATION DEVICES

(75) Inventor: Alexei Fomitchev, San Mateo, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 495 days.

(21) Appl. No.: 11/969,494

(22) Filed: Jan. 4, 2008

(65) Prior Publication Data

US 2009/0173783 A1    Jul. 9, 2009

(51) Int. Cl.
*G06K 5/00* (2006.01)
(52) U.S. Cl. ...................................... 235/380
(58) Field of Classification Search ............... 235/375, 235/379, 380, 382; 705/44
See application file for complete search history.

(56) References Cited

U.S. PATENT DOCUMENTS

2003/0173401 A1 * 9/2003 Yamagami .................. 235/380
2007/0168265 A1 * 7/2007 Rosenberger ................. 705/30

* cited by examiner

*Primary Examiner*—Seung H Lee
(74) *Attorney, Agent, or Firm*—Harry K. Ahn; Abelman Frayne & Schwab (57) ABSTRACT

Apparatus and method for indirectly determining activation status of newly issued financial presentation devices that replace existing financial presentation devices such as credit cards that are about to expire. The apparatus includes a computer device having an account update module that receives an account identifier for an existing credit card, determines a new expiration date associated with a newly issued credit card that replaces the existing credit card, retrieves transaction data associated with the new credit card and examines the expiration date of the retrieved data. If the expiration date associated with the retrieved transaction data matches the new expiration date, then the account update module determines that the newly issued card has been activated.

21 Claims, 4 Drawing Sheets

SYSTEM AND METHOD FOR PROVIDING ACTIVATION AND EXPIRATION DATA ASSOCIATED WITH NEWLY ISSUED FINANCIAL PRESENTATION DEVICES

FIELD OF THE INVENTION

The present invention relates to a data processing system, and more particularly, to a system and method for providing status of financial presentation devices that are presented to providers of goods and services for payment.

BACKGROUND OF THE INVENTION

Today, most people carry portable financial presentation devices such as credit cards, debit cards, prepaid cards, stored value devices and smart tag devices to pay for goods and services without using cash. All of these financial presentation devices have an account identifier (e.g., number) by which an individual device is uniquely identified. In the case of a credit or debit card, the account number typically has a 16 digit card number embossed on the card. The 16 digit number consists of an initial 6 digit Bank Identification Number (BIN), followed by a 10 digit number. The BIN identifies the issuer financial institution (e.g., bank), such as Bank of America®, Chase®, among others that issue credit cards. The remaining 10 digit number identifies a particular card issued by the issuer. Accordingly, the 16 digit number on the credit or debit card uniquely identifies a card, and therefore the cardholder.

Each issuer bank assigns an expiration date to the credit/debit cards. The expiration date is also embossed on the card and is set to expire at a predetermined time (e.g., four years) after being issued to the end-user (i.e., cardholder). Once the portable financial presentation device expires, it can no longer be used by the end-user to purchase goods and/or services from providers (i.e., merchants) of such goods and/or services.

Prior to the currently issued credit/debit card expiring, the end-user is issued a new card having the same 16-digit card number embossed on the card, but having a new expiration date embossed thereon. In some cases, however, the card number also may be different. The issuing financial institution sends (e.g., typically by mail) the newly issued credit/debit card to the cardholder's residence a predetermined period (e.g., approximately 10-20 days) prior to the expiration of their current card. The cardholder is provided with instructions to contact the issuing bank to activate the new credit/debit card, typically by telephone. Activation of the new credit/debit card requires providing the 16-digit card, among other identification and security information to the issuing bank, upon which the issuing bank authorizes and "activates" the new credit/debit card. Once the new card is activated, the cardholder can make purchases from any merchant that accepts the credit/debit card for business purposes.

Many merchants who provide repeated sales of services and/or goods to consumers also provide an automatic payment feature for the convenience of their customers/clients. One popular payment technique allows the customers to automatically provide payments for their purchases by using their credit card. For example, a cardholder who belongs to a health club can make monthly payments automatically by setting up an account with the merchant which automatically charges the cardholder's credit/debit card at a predetermined time (e.g., beginning of each month). In particular, the merchant's acquiring financial institution (e.g., acquiring bank) receives payment from the cardholder's issuing bank, and then forwards the payment to the merchant in a well known manner. Accordingly, the merchants consistently receive payment for their goods and/or services in a timely manner, and the cardholders do not have to be present at the point of sale to provide payment for each purchase.

As noted above, each cardholder's credit/debit card has an expiration date. Although the merchants know the expiration date for the current card, they will not know the expiration date for the newly issued card. Further, if the cardholder's credit card has expired prior to the next payment due date, the merchant will not know if the cardholder has activated his/her newly issued card. The newly issued card typically has the same account identifier, although the account identifier of the newly issued card can be different from the previously expired card. Accordingly, the merchant may be unable to charge the cardholder's credit/debit card for payment of the services and/or goods, since the merchant does not know the expiration date of the newly issued card as well as whether the newly issued card has been activated by the cardholder.

To avoid this problem, the processing facilitator (e.g., VISA®, MASTERCARD® and the like) provides an account update service that allows merchants to retrieve new account numbers, if any, and new expiration dates in a timely manner. Specifically, the issuers regularly send account update information (new account numbers, new expiration dates, etc.) to the processing facilitator. The processing facilitator stores the updated card information in an account database. When a merchant submits an account number of a card that is due to expire, the processing facilitator retrieves from the account update database, a new account number, if any, and a new expiration date of the newly issued card. However, even with this information, the request for charging a credit card may fail because the new card has not been activated by the cardholder.

As persons of ordinary skill in the art will appreciate, the merchants are placed in an undesirable circumstance of not being able to update their account data to timely charge the credit/debit card of a cardholder for a transaction if the newly issued card has not been activated. This idiosyncrasy can result in merchant dissatisfaction with the overall system because the authorization process becomes cumbersome, added expenses are required to obtain the necessary card information to process the transactions, and/or declines in sales revenues can occur due to the inability to expedite the sales transactions.

Therefore, it is desirable to provide a system and method for providing merchants with activation and expiration information for newly issued credit/debit cards associated with their accounts in an automated and timely manner to authorize and execute pending transactions.

SUMMARY OF THE INVENTION

According to one aspect of the present invention, a method is provided for determining activation of newly issued financial presentation devices that replace existing financial presentation devices, where each financial presentation device is presentable for conducting a transaction with a merchant providing goods or services. The method comprises receiving, from a merchant or agent thereof, an account identifier for an existing financial presentation device. The account identifier can be one of an account number of a credit, debit or prepaid presentation device.

A new expiration date associated with a newly issued financial presentation device, which replaces the existing financial presentation device identified by the received account identifier, is retrieved from an account update database, which stores new account identifier and new expiration date information regarding the newly issued financial presentation device.

Transaction data associated with the account identifier received from the merchant is retrieved form a transactional database which, in one embodiment includes a relational database and a non-relational database. A determination is made from the transaction data retrieved from the transactional database, whether an expiration date associated with the transaction data matches the new expiration date determined by the account update database for indicating activation status of the newly issued financial presentation device.

In another aspect of the present invention, an apparatus is provided for determining activation of newly issued financial presentation devices that replace existing financial presentation devices, where each financial presentation device is presentable for conducting a transaction with a merchant providing goods or services. The apparatus includes at least one computer device having an account update module operable to receive an account identifier for an existing financial presentation device; retrieve, from a transaction database, transaction data associated with the received account identifier; determine a new expiration date associated with a newly issued financial presentation device which replaces the existing financial presentation device identified by the received account identifier; and determine, from the retrieved transaction data, whether an expiration date associated with the transaction data matches the new expiration date for indicating activation status of the newly issued financial presentation device.

In one embodiment, the transactional database includes a first database having indexing based on the account identifier and transaction dates, where a first search is conducted using the account identifier and a second search is conducted on the results of the first search based on the transaction dates. Preferably, the first database is a relational database. The transactional database further includes a second database having indexing based on transaction dates and the account identifier, where a first search is conducted using the a transaction date and a second search is conducted on the results of the first search based on the account identifier. In one embodiment, the second database is a non-relational database.

DETAILED DESCRIPTION OF THE INVENTION

For purposes of illustration and clarity, the present invention will be discussed in the context of using a credit card. However, persons of ordinary skill in the art will appreciate that the novel features disclosed herein apply to all types of portable financial presentation devices including, but not limited to, credit cards, debit cards, prepaid cards, electronic benefit cards, charge cards, smart cards, key chain devices, personal digital assistants, cell phones, stored value devices or the like, so long as the device can be presented to a seller of goods or services for payment.

According to the present invention, a data retrieval system includes an account updater (IAU) module, which is a software program that enables the exchange of updated account information electronically among participating issuers, acquirers, and merchants that process transactions using account information they keep on file. These merchants include recurring bill payment providers, subscription services, Internet "one-click" merchants, and preferred customer programs such as travel and entertainment "gold clubs."

After meeting participation requirements, issuers and acquirers enroll with the processing facilitator to utilize the IAU. Acquirers enroll qualified merchants. Issuers provide the processing facilitator with changes to account numbers and expiration dates resulting from business situations such as product upgrades, acquisitions and mergers, account closures, and processing facilitator to processing facilitator (e.g., MasterCard-to-Visa) portfolio conversions.

Either directly or through their acquirers, the merchants can submit inquiries regarding accounts with which they have ongoing relationships. The IAU processes inquiries against its databases and provides responses to merchants either directly or via their acquirers. Participating merchants update their customer databases with refreshed account data before transactions are authorized, thereby avoiding potential declines, streamlining the authorization process, reducing costs, and saving valuable time.

The present invention includes a system and method for determining activation of newly issued financial presentation devices that replace existing financial presentation devices, each financial presentation device being presentable for conducting a transaction with a merchant providing goods or services. The system and method include a computer device operable to receive an account identifier for an existing financial presentation device; determine, from an account update database, a new expiration date associated with a newly issued financial presentation device which replaces the existing financial presentation device identified by the received account identifier; retrieve, from a transaction database, transaction data associated with the received account identifier; and determine, from the retrieved transaction data, whether an expiration date associated with the transaction data matches the new expiration date determined by the account update database for indicating activation status of the newly issued financial presentation device.

Figure 1:
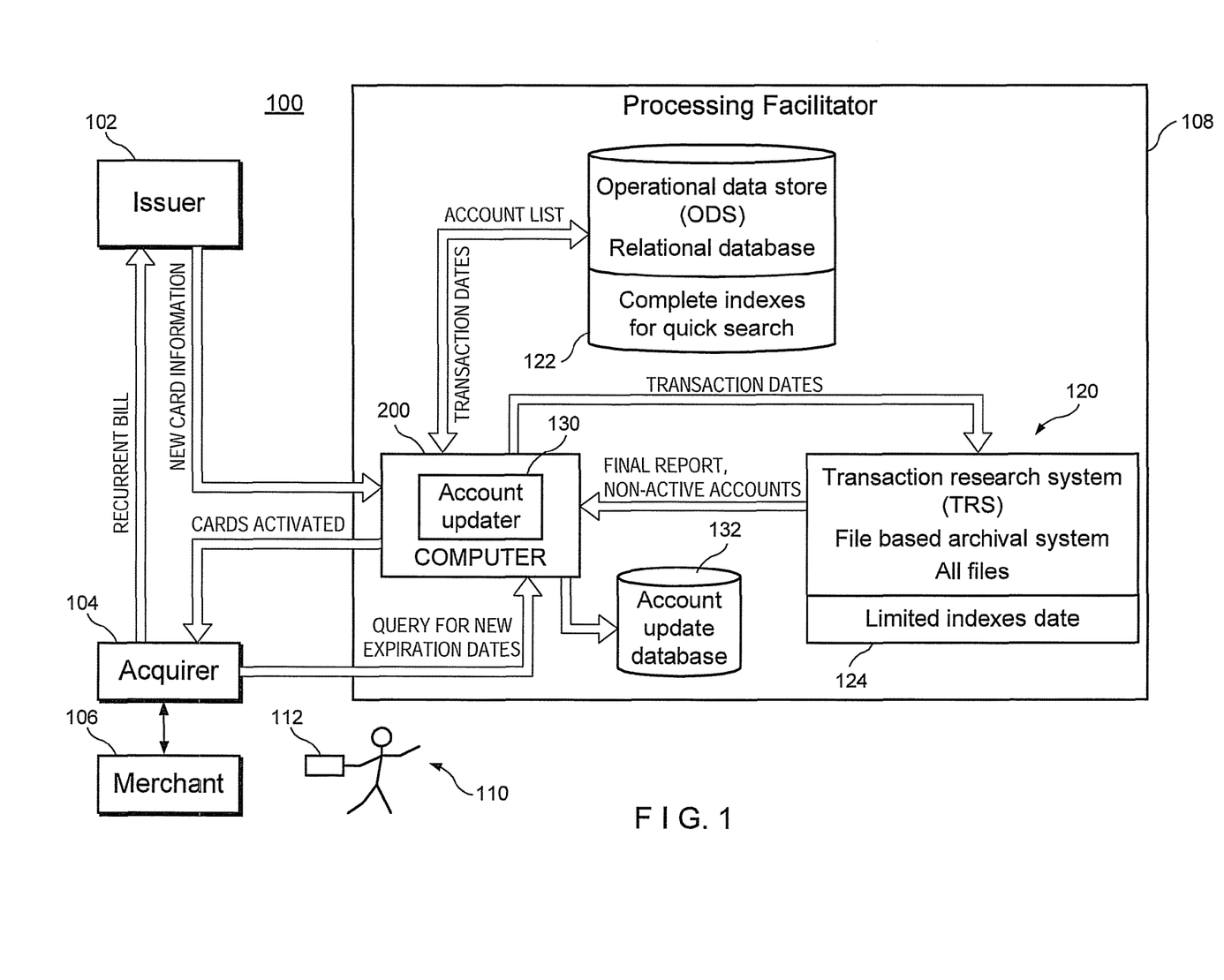
FIG. 1 is a block diagram of an exemplary system for storing and retrieving information associated with mobile financial presentation devices from a processing facilitator.

An exemplary block diagram of the above-described data retrieval system 100 is shown in FIG. 1. The data retrieval system 100 includes at least one issuer bank 102, at least one acquirer bank 104, at least one merchant 106, and a processing facilitator 108. Each issuer bank 102 is a financial institution (e.g., bank) or other organization that issues the mobile financial presentation devices (e.g., credit/debit card) 112 to the cardholders 110, who are the owners of the cards 112 used to purchase the goods/services. Each merchant 106 is a business accepting financial presentation device payments for products or services sold to the cardholder 110. Each acquirer 104 is a financial institution (e.g., bank) or other organization that provides card processing services to the merchant 106. The processing facilitator 108 is a network such as VISA® or MASTERCARD® (and others) that acts as a gateway between the acquirer 104 and issuer 106 for authorizing and funding transactions.

When a purchase is made, the cardholder 110 agrees to pay the card issuer 102. The cardholder 110 indicates their consent to pay, by signing a receipt with a record of the card details and indicating the amount to be paid or by entering a Personal identification number (PIN). Also, many merchants 106 accept verbal authorizations via telephone and electronic authorization using the Internet, known as a card not present (CNP) transaction.

Electronic verification systems allow merchants 106 to verify that the card 112 is valid and the cardholder customer has sufficient credit/funds to cover the purchase in a few seconds, allowing the verification to happen at time of purchase. The verification is performed using a card payment terminal or point-of-sale (POS) system with a communications link to the merchant's acquiring bank 104. Data from the card 112 is obtained from a magnetic stripe or chip on the card in a well known manner. As described below in further detail, the verification process for the merchants (i.e., acquiring banks) requires ascertainment of the expiration date for any newly issued mobile financial presentation devices 112 prior to authorizing the transaction (i.e., accepting payment for the goods/services provided by the merchants).

From the perspective of the merchants 106, a credit/debit card transaction is often more secure than other forms of payment, such as checks, because the issuing bank commits to pay the merchant the moment the transaction is authorized, regardless of whether the consumer defaults on their credit card payment, excluding legitimate disputes, which can result in charge backs to the merchant. For each purchase, the bank charges a commission (discount fee) to the merchant for this service. Even so, card not present transactions present higher risk of loss to the merchant, since the magnetic strip or chip is not being directly read by the card reader and the merchant cannot readily receive additional personal identification information from the cardholder.

Generally, when the cardholder 110 pays for the purchase the merchant 106 performs some risk assessment and may submit the transaction to the acquirer 104 for authorization. The acquirer 104 verifies with the issuer 102, almost instantly, that the card number (with expiration date) and transaction amount are both valid, and informs the merchant 106 on how to proceed. The merchant can use the verification information to determine whether to proceed with or decline the transaction with the cardholder 110. The issuer 102 may provisionally debit the funds from the cardholder's credit account at this stage.

More specifically, the processing facilitator 108 includes at least one computer device 200 (FIG. 2), such as at least one server, which includes a processing facilitator account update software module 130 for receiving current and new financial presentation device information from the issuing financial institution 102, and executing one or more programs to perform information searches and data retrieval from one or more data storage devices. The data storage devices include a transactional database 120 and an account update database 132, as discussed below in further detail.

Figure 2:
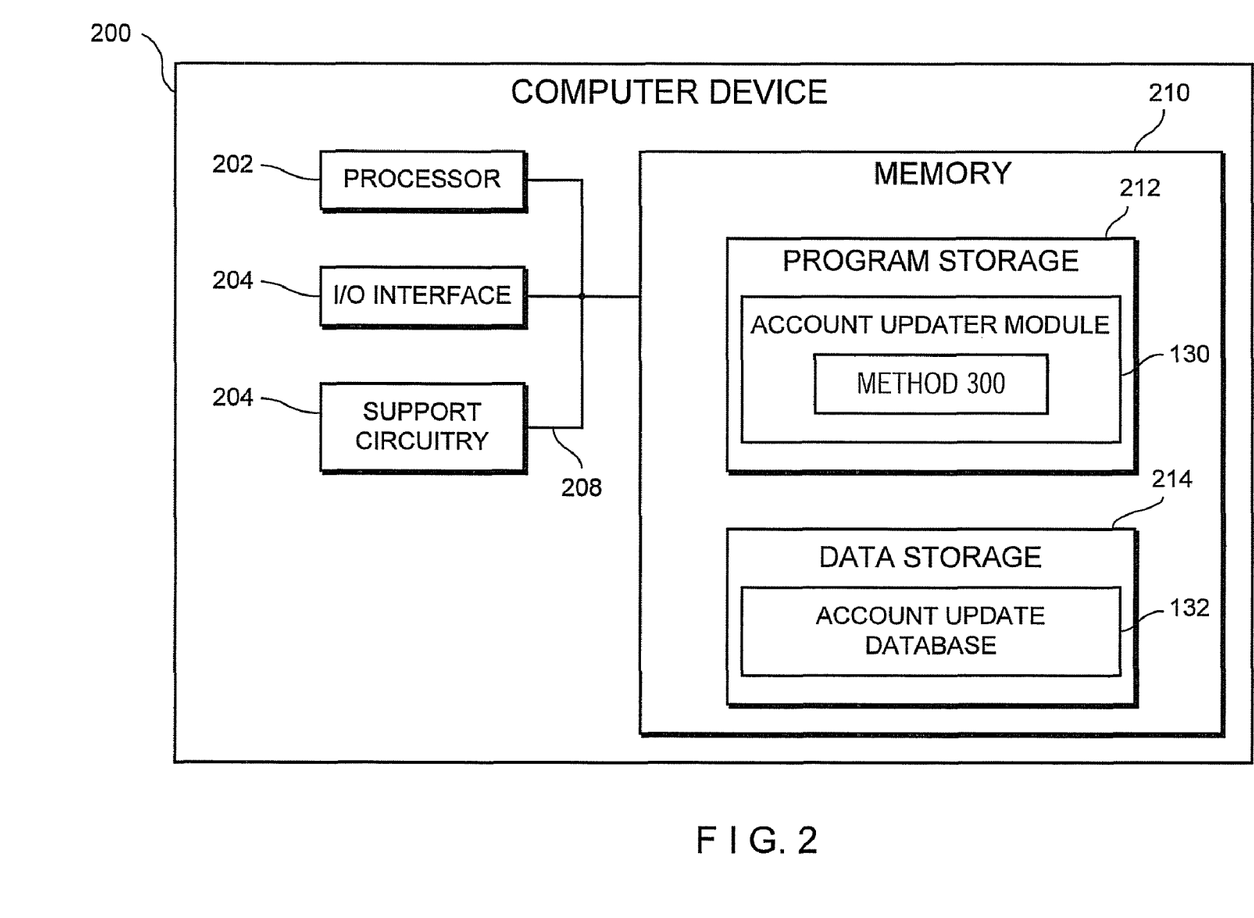
FIG. 2 illustrates a block diagram of a computer device that stores and executes an account updater module of the present invention.

Referring now to FIG. 2, the computer device 200 can be one or more servers that centrally manage the receipt of new card information from the issuers 102 and execute programs to perform database searches to query for new expiration dates of the credit/debit cards. The computer device 200 includes a multitasking, real-time software technology that can concurrently handle hundreds of thousands of queries and updates.

The computer device 200 can be any computer device such as a personal computer, minicomputer, workstation or mainframe, or a combination thereof. While the computer device 200 is shown, for illustration purposes, as a single computer unit, the system may comprise a group/farm of computers which can be scaled depending on the processing load and database size.

Specifically, the computer device 200 comprises at least one processor 202, as well as memory 210 for storing various control programs 212. The processor 202 may be any conventional processor, such as one or more INTEL® Processors. The memory 210 can comprise volatile memory (e.g., DRAM), non-volatile memory (e.g., disk drives) and/or a combination thereof. The processor 202 cooperates with support circuitry 206, such as power supplies, clock circuits, cache memory, among other conventional support circuitry, to assist in executing software routines (e.g., method 300) stored in the memory 210. The one or more processors 202, memory 210 and support circuitry 206 are all commonly connected to each other through one or more bus and/or communication mediums (e.g., cabling) 208.

The computer device 200 also comprises input/output (I/O) circuitry 204 that forms an interface between various functional elements communicating with the computer device 200. For example, the computer device 200 is connected to a communication link through an I/O interface 204, which receives information from and sends information over the communication link to various card issuers 102.

The memory 210 includes program storage 212 and data storage 214. The program storage 212 stores an account update module 130 of the present invention, an operating system, such as a WINDOWS® operating system, among other application programs and data retrieval modules. The data storage 214 can be an internal or separate storage device, such as one or more disk drive arrays that can be accessed via the I/O interface 204 to read/write data. The data storage 214 includes the account update database 132 that can store the new card information provided from the issuer 102, reports that are generated by the IAU 130, lists of account identifiers to be searched for expiration dates in accordance with the present invention, among other information. The account update database 132 can be provided internally (as shown in FIG. 2) or externally (as shown in FIG. 1) to the computer device 200. Any of the software program modules in the program storage 212 and data from the data storage 214 are transferred to specific memory locations (e.g., RAM) as needed for execution by the processor 202.

As such, it is contemplated that some of the process steps discussed herein as software processes may be implemented within hardware, for example, as circuitry that cooperates with the processor 202 to perform various steps. It is noted that the operating system (not shown) and optionally various application programs (not shown) are stored in the memory 210 to run specific tasks and enable user interaction.

Referring again to FIG. 1, the processing facilitator 108 also stores daily financial presentation device transactional information received from the merchant's acquiring institutions 104. The raw data from the transactional information is filtered and stored in one or more transactional data storage warehouses or transactional databases 120. In one embodiment, the data storage warehouses 120 include a relational database 122 and a non-relational database 124. In this embodiment, portions of the raw transactional data can be duplicated and/or stored separately on the relational database 122 and/or the non-relational database 124.

In particular, the relational database 122 can be an operational data store (ODS), which is a database designed to integrate data from multiple sources to facilitate very quick operations, analysis and reporting. The relational database 122 includes transactional information associated with the purchase of goods/services by a consumer using a financial presentation device, such as a credit/debit card. The transactional information can include account identifier, transaction date, merchant name, transaction amount, transaction process fee, and the like. However, in the embodiment shown, the transactional information stored in the relational database 122 does not include the expiration date of the financial presentation device used to conduct the transaction. The relational database 122 includes a high level of indexing to permit quick access to the various fields forming the database records.

In one embodiment, the relational database 122 includes indexing on account identifiers and on transaction dates. The relational database 122 can be used, for example, to quickly search and retrieve transaction information by using a specific account identifier and transaction dates.

The non-relational database 124 can be a file based archival system, such as a tape backup system, disk drive array and/or a combination thereof, as well as other well-known mass storage devices. The non-relational database 124 includes similar transactional information as discussed above for the relational database 122, as well as other transactional information, which importantly includes the expiration dates associated with each financial presentation device used during a transaction on a particular day, among other transactional information.

Unlike the relational database 122, the non-relational database 124 has minimal indexing capabilities and in one embodiment, includes indexing based on transaction dates. In this embodiment, searching for transaction records for a particular account identifier can be very slow as the database 124 needs to search sequentially. However, if the search can be narrowed using a transaction date as one of the search criteria, the search for transaction data can proceed much faster as the transaction dates can at least point to a particular tape or disk that needs to be read.

Accordingly, in this embodiment, the relational database 122 is initially searched to quickly retrieve transaction data by account identifier over a predetermined period to obtain transaction dates contained in the retrieved transaction data. Then, the transaction dates which were retrieved over the predetermined time from the relational database 122 are used to conduct a second search in the non-relational database 124 for the particular account identifier to retrieve transaction data to obtain the expiration dates contained therein.

The merchants can submit inquiries, either directly or through their acquirers, to the processing facilitator regarding those accounts that pay for their transactions by using a credit/debit card, and of which are approaching the expiration date. The inquiries include a list of those account identifiers that have an expiration date that will lapse prior to executing the next transaction.

Figure 3:
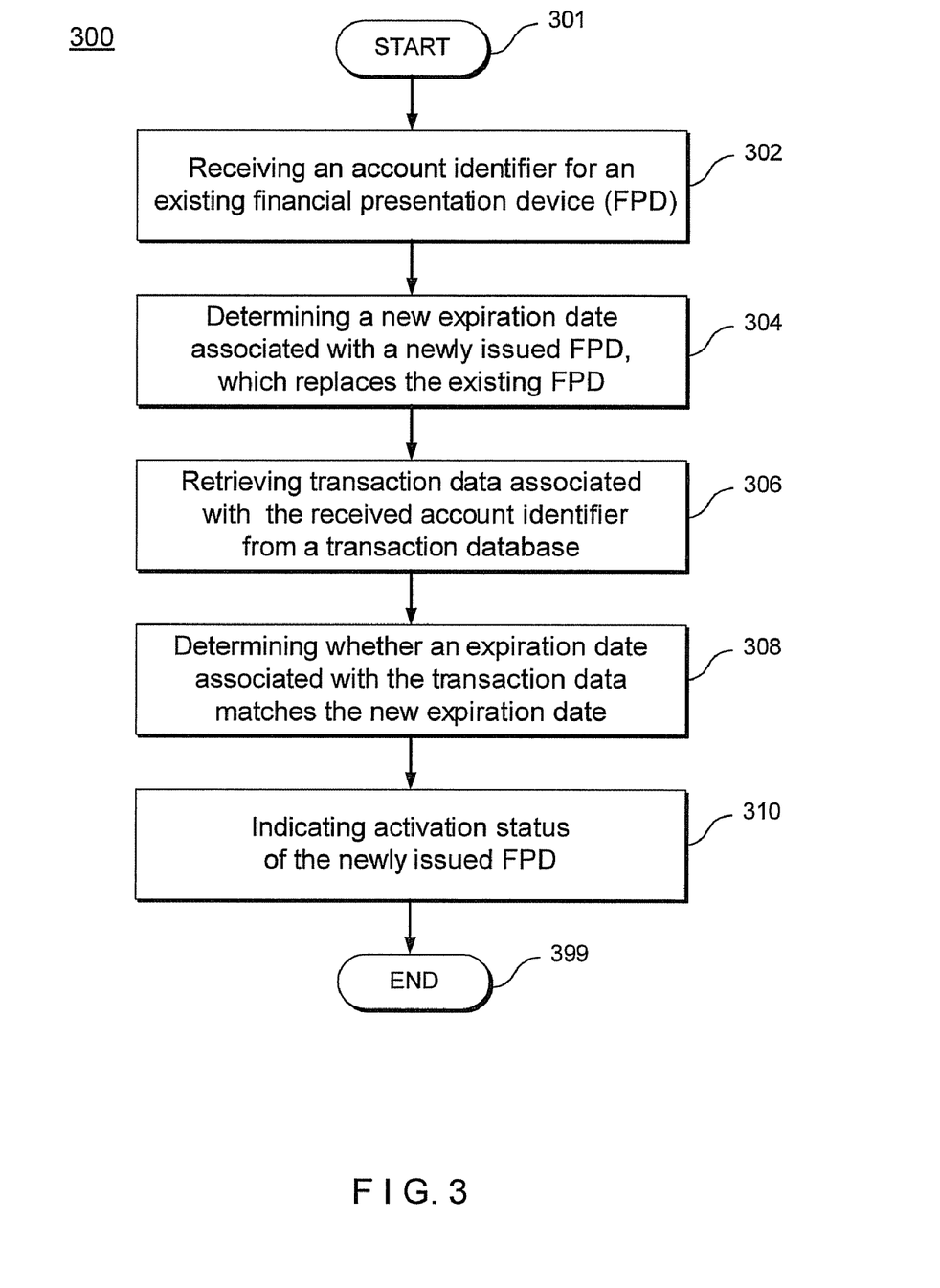
FIG. 3 is a flow diagram of a method for determining activation of newly issued financial presentation devices.

Referring to FIG. 3, a method 300 for determining activation of newly issued financial presentation devices is illustrated. In particular, method 300 enables an account updater 130 of the present invention, which is implemented at a computer based network such as a processing facilitator 108, to query the transaction database 120 for determining activation of newly issued financial presentation devices that replace existing financial presentation devices, as well as its new expiration date.

The method 300 is a program component of the account update module 130 which is executed by the processor 202 of the computer device 200. The method 300 provides activation and expiration data associated with newly issued financial presentation devices, where each financial presentation device is presentable for conducting a transaction with a merchant that provides goods and/or services.

In particular, the method 300 obtains the expiration date of a financial presentation device 112 that was used in the most recent transactions by a customer 110. The method 300 compares the expiration date of the financial presentation device 112 used in the most recent transactions to the new expiration date for the newly issued financial presentation device 112 that was recently provided by the issuer institution 102 to the customer 110. If the expiration date retrieved from the transaction data matches the new expiration date provided by the issuer 102, the newly issued financial presentation device 112 is assumed to have been previously activated by the cardholder 110, and such activation can be reported directly to the merchant 106 or indirectly through the acquirer 104 associated with the merchant 106.

The method 300 for determining activation of newly issued financial presentation devices that replace existing financial presentation device starts at 301, where the issuer 102 provides new financial presentation device information to the processing facilitator 108. The financial presentation device information includes the account identifier and associated new expiration date. The account identifier can be the same identifier as the previous account identifier or a new account identifier (e.g., account number). In one embodiment, the new financial presentation device information is provided to the processing facilitator 108 by each issuer 102 at a predetermined time interval, such as daily, weekly, monthly, or any other predetermined interval. The plurality of account identifiers and associated expiration dates from the issuers 102 is preferably stored in the data storage memory 214, although the location for storing the received plurality of new account identifiers and associated expiration dates is not limiting.

At step 302, at least one account identifier for an existing financial presentation device, typically one which is about to expire, is received at the account updater (IAU) 130 from a merchant 106 or an acquiring institution 104 for the merchant 106, in which the merchant would like to receive the new device information such as new expiration date. In particular, a plurality of account identifiers are received, for example, by the processing facilitator 108 although the example herein describes the method using one account identifier for purposes of clarity. The plurality of account identifiers are illustratively the unique account numbers assigned to the financial presentation devices (e.g., credit/debit cards). The plurality of account identifiers are sent to the IAU 130 either directly by a merchant 106 or by the acquiring institution 104 for the merchant 106 when the expiration date of an existing financial presentation device 112 of a customer 110 is about to lapse. The plurality of account identifiers from the merchants 106 or acquirers 104 are also preferably stored in the data storage memory 214, although the location for storing the received plurality of account identifiers is not limiting.

At step 304, the account update module 130 queries the account update database 132 to identify a new expiration date associated with a newly issued financial presentation device, which replaces the existing financial presentation device identified by the received account identifier. In particular, once a merchant (or acquiring agent) sends a request to obtain a new expiration date of a newly issued financial presentation device 112, the IAU 130 searches the account update database 132, based on the merchant requested account identifier, for the new expiration date associated with the newly issued financial presentation device.

In one embodiment, the database 132 also stores an activation flag that is set to "true" if the request for new expiration date has been made previously and the IAU 130 has already determined that the presentation device 112 with the new expiration date has already been activated. In that case, the IAU 130 skips steps 306-308 and executes step 310.

At step 306, based on the received account identifier, the IAU 130 queries a transaction database 120 to retrieve transaction history data for that account identifier over a predetermined time period. If no transaction history data are retrieved, the method proceeds to step 310, where the newly issued presentation device is assumed not to have been activated and an indication of "no information available" or "unknown" is provided to the merchant.

At step 308, a determination is made whether the expiration date contained in the transaction data that was retrieved from the transaction database 120 matches the new expiration date identified at step 304. In particular, the IAU 130 compares the expiration date contained in the transaction data that was retrieved from the transaction database 120 to the new expiration date provided by the issuer 104.

At step 310, if the comparison step 308 results in a match, the financial presentation device 112 is assumed to have been activated and the IAU 130 sends the new expiration date to the merchant 106 and the activation flag of the account update database 132 is updated as "true". Otherwise, the financial presentation device 112 is deemed as not having been activated and the IAU 130 sends to the merchant 106 an indication of "no information available". Alternatively, the IAU 130 may send the new expiration date along with an indication that activation of the newly issued financial presentation device 112 is unknown at this time. Still in another alternative embodiment, no message is provided to the merchant.

A person skilled in the art will appreciate that activation status of the newly issued presentation device 112 can be represented by alpha-numeric characters or other symbols to signify the active/inactive/unknown state of a financial presentation device 112. At step 399, the method 300 ends.

As noted above, the processing facilitator 108 archives transactional records for each account in a "flat" database in storage mediums, such as tape backup systems and/or disk drive arrays, and implements a non-relational database with minimal indexing capabilities that do not provide retrieval of the information necessary to determine whether a particular cardholder has activated his/her new credit/debit card in a timely manner for card authorization to execute pending transactions. The inability for the processing facilitator 108 to provide a quick response to the expiration and activation inquiries hinders the merchants' ability to update their account-on-file information, which reduces authorization approvals. The inability to efficiently and quickly retrieve activation and expiration information for the newly issued cards can contribute to reductions in sales and revenues, and cause declines in the merchants' customer base. Further, the inability to provide expedient account information can increase the costs associated with contacting customers to obtain the updated information, as well as possibly cause interrupted service from the perspective of the consumer.

Figure 4:
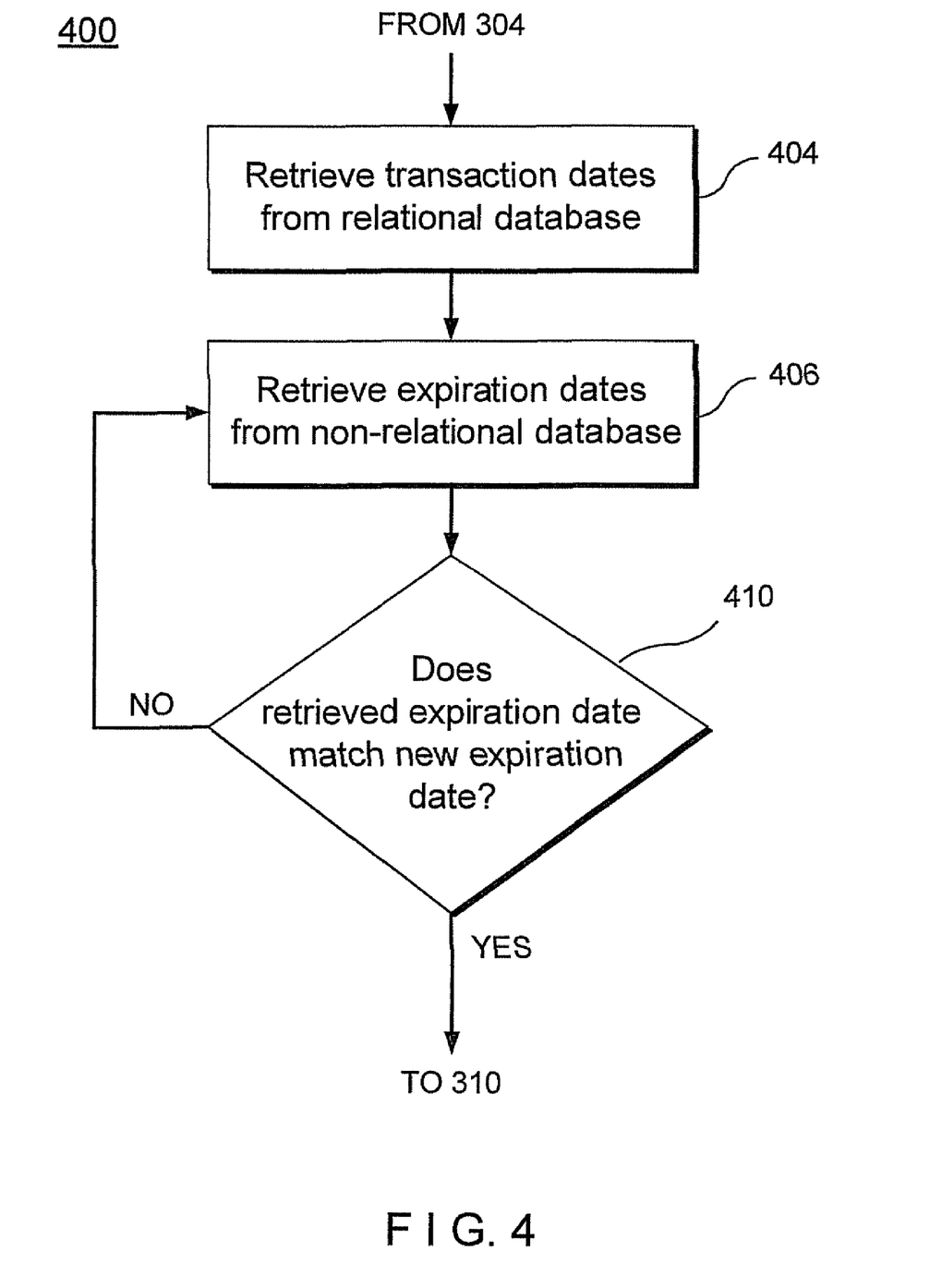
FIG. 4 is a flow diagram of a method for determining activation of newly issued financial presentation devices according to another aspect of the present invention.

Accordingly, as an alternative embodiment, a flow diagram of a method for determining activation of newly issued financial presentation devices is illustrated in FIG. 4 which replaces steps 306-308 in FIG. 3 in which the transaction data is stored and spread over two separate databases. Specifically, FIG. 4 relates to an embodiment where the transactional database 120 includes the relational database 122 and the non-relational archive database 124.

In that case, a first search is conducted on the relational database 122, to obtain transaction dates from transaction history data associated with the account identifier over a predetermined time period (e.g., the most recent 90 days). Then, a second search is conducted on the non-relational database 124 to obtain expiration dates by using the transaction dates obtained in the previous step as will be described in more detail below.

At step 404, a first search is conducted on the relational database 122 to retrieve transaction dates over a predetermined time period for a specific account identifier provided by the merchant 106. As discussed above, the account identifier can be the same account identifier (e.g., card number) or a different account identifier.

Specifically, the relational database 122 is queried using the criteria of an account identifier and predetermined transaction time period to retrieve transaction history data for transactions that have been conducted using a presentation device associated with the account identifier over the predetermined time period. From the retrieved transaction history, a plurality of transaction dates are obtained.

At step 406, a second search is conducted on the non-relational database 124 using the search criteria of the account identifier and the plurality of transaction dates obtained in step 404 starting with the most recent transaction date to retrieve a transaction history data. From each transaction history data retrieved, an expiration date contained in the transaction data history is obtained.

In decision block 410, a determination is made as to whether the retrieved expiration date matches the new expiration date retrieved in step 304. If there is a match, then the method proceeds to step 310 of method 300.

If there is no match, then the method 400 selects the next most recent transaction date and repeats steps 406 and 410. If there are no more transaction dates left, then control passes to step 310.

As shown in the flow diagram of FIG. 4, for each account identifier, a search on the second database 124 is conducted by using the transaction dates identified from the first database 122, and then searching the second database 124 based on the same account identifier and the transaction dates. Accordingly, the first database 122 is used to narrow the search down to a specific date for subsequently conducting the search for an expiration date on the second database 124.

Accordingly, the present invention helps merchants update their account-on-file information, and provides an automated, dedicated, and secure clearinghouse for easy access to this information. The IAU 130 also makes changes to cardholder account information available to the merchants 106 in a timely (real-time or in batches), efficient, and cost-effective manner.

Although the computer device 200 and corresponding account updater 130 and databases 122, 124 and 132 are preferably facilitated by the processing facilitator 108, a person skilled in the art will appreciate that the present invention can be implemented as an issuer 102 or acquirer 104 in a similar manner. In particular, since the transfer of information is by electronic means, the issuer 102 or acquirer 104 can implement account updater 130 and associated databases on one or more computer devices 200 operated at their facilities.

From the perspective of the issuer, the IAU 130 advantageously maintains continuity of payment relationships with the cardholder by reducing the opportunity to switch payment method or cancel the service when account information changes. The IAU 130 helps retain customers by making payment with a financial presentation device more convenient. Further, the IAU 130 increases sales volume, and helps achieve deeper penetration into the account-on-file segment, including the recurring bill payment segment. Moreover, the IAU 130 helps reduce costs of customer service calls resulting from account data-related declines.

From the perspective of the acquirer 104, the IAU 130 advantageously strengthens relationships with existing account-on-file merchants by reducing declines caused by changes in account information. The IAU 130 offers acquirers a competitive advantage by providing a new merchant service. Additionally, the IAU 130 increases sales volume due to seamless acceptance for account-on-file transactions.

From the perspective of the Merchant 106, the IAU 130 advantageously simplifies and secures account-on-file transactions, as well as increases authorization approvals. Further, the IAU 130 reduces the costs associated with contacting customers to obtain updated information. Additionally, the IAU 130 helps increase sales and retain customers, as well as reduces customer service expenses by preventing interruption of payment relationship.

From the perspective of the consumer 110, the IAU 130 advantageously offers a seamless account update process. Moreover, the IAU 130 facilitates uninterrupted service, and reduces negative experiences caused by authorization declines.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A method for determining activation of newly issued financial presentation devices that replace existing financial presentation devices, each financial presentation device being presentable for conducting a transaction with a merchant providing goods or services, the method comprising:
   receiving an account identifier for an existing financial presentation device;
   determining, from an account update database, a new expiration date associated with a newly issued financial presentation device, which replaces the existing financial presentation device identified by the received account identifier;
   retrieving, from a transaction database, transaction data associated with the received account identifier; and
   determining, from the retrieved transaction data, whether an expiration date associated with the transaction data matches the new expiration date determined by the account update database for indicating activation status of the newly issued financial presentation device.

2. The method according to claim 1, wherein the step of receiving an account identifier includes receiving from a merchant, an account identifier of a credit, debit or prepaid presentation device.

3. The method according to claim 1, wherein the step of determining a new expiration date associated with a newly issued financial presentation device comprises:
   storing in the account update database, a plurality of account identifiers and associated new expiration dates from at least one issuer at predetermined times; and
   retrieving from the account update database, a second account identifier and associated new expiration date associated with the newly issued financial presentation device based on the received account identifier.

4. The method according to claim 3, wherein the step of retrieving a second account identifier includes receiving an identifier that matches the received account identifier.

5. The method according to claim 1, wherein the step of retrieving, from a transaction database, transaction data associated with the received account identifier comprises:
   retrieving, from a first database, first transactional data associated with the received account identifier and covering transactions occurring within a predetermined time period;
   retrieving one or more transaction dates from the first transactional data; and
   retrieving, from a second database, second transactional data including expiration dates associated with the received account identifier based on the retrieved transaction dates.

6. The method according to claim 5, wherein the step of retrieving first transactional data includes retrieving the first transaction data covering transactions having occurred within a period of approximately ninety days.

7. The method according to claim 5, wherein the first database comprises a relational database and the second database comprises a non-relational database.

8. The method according to claim 5, wherein the step of retrieving the second transaction data includes retrieving transaction data starting from a most recent transaction date among the first transaction data retrieved from the first database.

9. The method according to claim 8, further comprising retrieving transaction data starting from a next most recent transaction date among the first transaction data retrieved from the first database, in an instance where the expiration date associated with the previously retrieved transaction data fails to match the new expiration date.

10. The method according to claim 1, further comprising storing, at the account update database, the activation status of the newly issued financial presentation device.

11. The method according to claim 1, further comprising sending the new expiration date that matches the expiration date associated with the transaction data to either an acquirer or merchant.

12. Apparatus for determining activation of newly issued financial presentation devices that replace existing financial presentation devices, each financial presentation device being presentable for conducting a transaction with a merchant providing goods or services, the apparatus comprising:
   at least one computer device having an account update module operable to:
      receive an account identifier for an existing financial presentation device;
      retrieve, from a transaction database, transaction data associated with the received account identifier;
      determine a new expiration date associated with a newly issued financial presentation device which replaces the existing financial presentation device identified by the received account identifier; and
      determine, from the retrieved transaction data, whether an expiration date associated with the transaction data matches the new expiration date for indicating activation status of the newly issued financial presentation device.

13. The apparatus according to claim 12, wherein the account identifier includes one of an account number of a credit, debit or prepaid presentation device.

14. The apparatus according to claim 12, wherein the transactional database comprises:
   a first database having indexing based on the account identifiers and transaction dates; and
   a second database having indexing based on transaction dates and the account identifiers.

15. The apparatus according to claim 14, wherein the first database comprises a relational database and the second database comprises a non-relational database.

16. The apparatus according to claim 14, wherein the computer device is further operable to:
- retrieve, from the first database, first transactional data associated with the received account identifier and covering transactions within a predetermined time period;
- retrieve one or more transaction dates from the first transactional data; and
- retrieve, from the second database, second transactional data including expiration dates associated with the received account identifier based on the retrieved transaction dates.

17. The apparatus according to claim 16, wherein the predetermined time period is approximately ninety days.

18. The apparatus according to claim 16, wherein the one or more transaction dates from the first transactional data starts from a most recent transaction date among the first transaction data retrieved from the first database.

19. The apparatus according to claim 18, wherein the computer device is further operable to retrieve transaction data starting from a next most recent transaction date among the first transaction data retrieved from the first database, in an instance where the expiration date associated with the previously retrieved transaction data fails to match the new expiration date.

20. The apparatus according to claim 12, wherein the at least one computer device is further operable to store, at the account update database, the activation status of the newly issued financial presentation device.

21. The apparatus according to claim 12, wherein the at least one computer device is further operable to send the new expiration date that matches the expiration date associated with the transaction data to either an acquirer or merchant.

* * * * *